United States Patent [19]

Heireth et al.

[11] Patent Number: 5,010,994
[45] Date of Patent: Apr. 30, 1991

[54] CENTRIFUGAL CLUTCH AND METHOD OF PRODUCING SAME

[75] Inventors: Hermann Heireth, Esslingen; Dieter Messerschmidt, Korntal, both of Fed. Rep. of Germany

[73] Assignee: Dr. Ing. h.c.F. Porsche AG, Fed. Rep. of Germany

[21] Appl. No.: 512,184

[22] Filed: Apr. 20, 1990

[30] Foreign Application Priority Data

Apr. 21, 1989 [DE] Fed. Rep. of Germany ....... 3913106

[51] Int. Cl.$^5$ .................. F16D 23/10; F16D 43/06
[52] U.S. Cl. ................. 192/103 B; 192/104 B; 192/105 BA
[58] Field of Search .......... 192/103 B, 104 B, 105 BA

[56] References Cited

U.S. PATENT DOCUMENTS

| | | | |
|---|---|---|---|
| 2,075,078 | 3/1937 | Allen | 192/103 B X |
| 2,108,105 | 2/1938 | Cotterman | 192/103 B |
| 3,187,869 | 6/1965 | Spencer | 192/104 B |
| 4,117,918 | 10/1978 | Silberschlag | 192/103 B |
| 4,140,210 | 2/1979 | Schulz | 192/103 B |

Primary Examiner—Allan D. Herrmann
Assistant Examiner—Nicholas Whitelaw
Attorney, Agent, or Firm—Evenson, Wands, Edwards, Lenahan & McKeown

[57] ABSTRACT

A centrifugal clutch, and a method of producing same, include driving inner runner on whose circumference a plurality of resilient clutch elements are arranged to move radially outwards with increasing speed and, at clutch speed, to bear against an inner surface of a drum-shaped outer runner for driving the outer runner. In order to assure low-wear operation even at high clutch speeds, the clutch elements are constructed integral with a rotating ring and form, together with the ring, an intermediate runner. Segments of the elements extend from the ring in the axial direction of the clutch.

18 Claims, 1 Drawing Sheet

CENTRIFUGAL CLUTCH AND METHOD OF PRODUCING SAME

BACKGROUND AND SUMMARY OF THE INVENTION

The invention relates to a centrifugal clutch and method of producing same, and, more particularly, to a clutch with a driving inner runner carrying on its circumference a plurality of resilient clutch elements made in one piece with a rotating ring which moves radially outwards with increasing speed and, at clutch speed, bear against the inner surface of a drum-shaped outer ring.

A centrifugal clutch is disclosed in German Utility Model 1,883,236. In this known centrifugal clutch, the radial forces acting on the clutch elements consist exclusively of centrifugal forces. The process of engaging and disengaging the clutch lasts a relatively long time, especially at high clutch speeds of over approximately 20,000 revolutions per minute, that is to say, far above the maximum speeds of normal reciprocating internal combustion engines. This results in high wear in the friction surfaces. A further result is that the speeds for the full engagement and disengagement of the clutch cannot be fixed sufficiently accurately.

U.S. Pat. No. 4,117,918 discloses the use of a roller member running up onto an inclined face for supporting the centrifugal forces of the clutch elements. The motion of the clutch elements necessary for this arrangement, however, in the peripheral direction requires a disadvantageous sliding application of springs, which results in an unsatisfactory accuracy for the radial restoring forces acting on the clutch elements. Moreover, although it was known to load the roller members by use of tension springs supported at the clutch elements, substantial additional expenses are undesirably incurred by the need to use two tension springs per clutch element and a bearing cage.

Further, U.S. Pat. No. 3,008,313 discloses a clutch, with particular application for injection pumps, in which the assistance of rolling members supported at inclined faces is enlisted to enable a sight angular adjustment between an input shaft and an output shaft depending upon the speed, although no clutching process takes place.

U.S. Pat. No. 4,140,210 discloses an arrangement whose purpose is to reduce friction between clutch elements and a runner, but does so by inclining the entire clutch element. This construction involves additional and thus undesirable expenses for constructing recesses in the inner runner.

It is an object of the invention to construct a centrifugal clutch of the aforementioned type which, especially when it is used at high speeds such as occur, for example, in connection with the operation of turbines driven by exhaust gas, assure low-wear operation and fixing of the speeds of engagement and disengagement of the clutch in a narrow tolerance band.

This objection has been achieved in a centrifugal clutch according to the present invention by providing a ring which forms, with the clutch elements, an intermediate runner. The ring is fastened to the inner runner in such a way that upon fixing in the radial direction a relative motion in the peripheral direction is possible by a slight amount. Rolling members, such as rollers and balls, are supported on flat or curved inclined faces of the inner runner which rise counter to the direction of the rotation of the inner runner and are arranged between the clutch elements and the inner runners.

The centrifugal clutch construction according to the invention greatly increases the radial forces acting on each clutch element at the start of clutching so that the frictional forces which commence at the instant and act upon the clutch elements cause displacement of the clutch elements in the peripheral direction. This displacement is enabled by the separation of the inner runners and the intermediate runners and by the specified type of fastening of the ring to the inner runner. The rolling members are caused to run up onto the inclined faces. This support offered to the centrifugal forces of the clutch elements by the radial forces exerted by the rolling members shortens the clutching process up to complete, non-slip clutching, whereby the clutch speed can also be more accurately fixed.

The present invention employs simple yet reliable fastening of the ring to a radial surface of the inner runner which forms a shoulder. Resilient connections of the clutch elements to the ring in such a way to permit tilting of the clutch elements about these connections in accordance with the present invention permit a stiff configuration of each clutch element, thus enabling a simultaneous application of the entire outer surface of each clutch element to the outer runner. Weakening of the necking material in the connection between each clutch element and ring allows the spring characteristics to be varied during production and thus accurately adjusted to specific requirements.

The present invention also provides a centrifugal clutch on which the rolling members are loaded in a direction on which the inclined faces are caused to rise by a spring supported on radial faces of the inner runner. This arrangement guarantees application of the rolling members both to the clutch elements and also to the inclined surfaces without play and with a cage being necessary for the rolling members.

According to yet another feature of the present invention, an oil-peeling nose formed by the end face of each clutch element is curved forward in its radially outward region peels off any oil film present on the inner surface of the runner when the nose approaches the outer runner, whereby the friction coefficient and hence the clutching forces between outer and intermediate runner are increased.

The present invention further provides that in the region of each clutch element, rearward and with respect to the direction of rotation of the inner runners, the outer surface of the clutch element is reduced radially inward and forms and acute angle with respect to the peripheral directions. Thus, when the speed of the outer runner is higher by comparison between the inner and the outer runner, an oil wedge is formed between the clutch elements and the outer runner and reduces the friction between these parts and thus delays braking of the outer runner.

The method for producing the centrifugal clutch in accordance with the present invention involves constructing an annular body as an intermediate runner, and machining the outer surfaces of the clutch elements and/or the inner surface of the outer runner to size at clutch engagement speed. This guarantees accurate maintenance of the radial dimensions of the clutch elements and the outer runner which appear with the clutch speed and are extremely important for the clutching and declutching process, even if, due to differences in manufacture and irregularities in the material, slight differences should result in the masses and spring characteristics of the individual clutch elements. Moreover, it is possible by virtue of the present invention to machine the intermediate runner which is separate from the inner runner.

BRIEF DESCRIPTION OF THE DRAWINGS

These and other features, aspects, advantages and objects to the present invention will become more apparent from the following detailed description of a presently preferred embodiment when taken in conjunction with the accompanying drawings wherein.

DETAILED DESCRIPTION OF THE DRAWINGS

Figure 1:
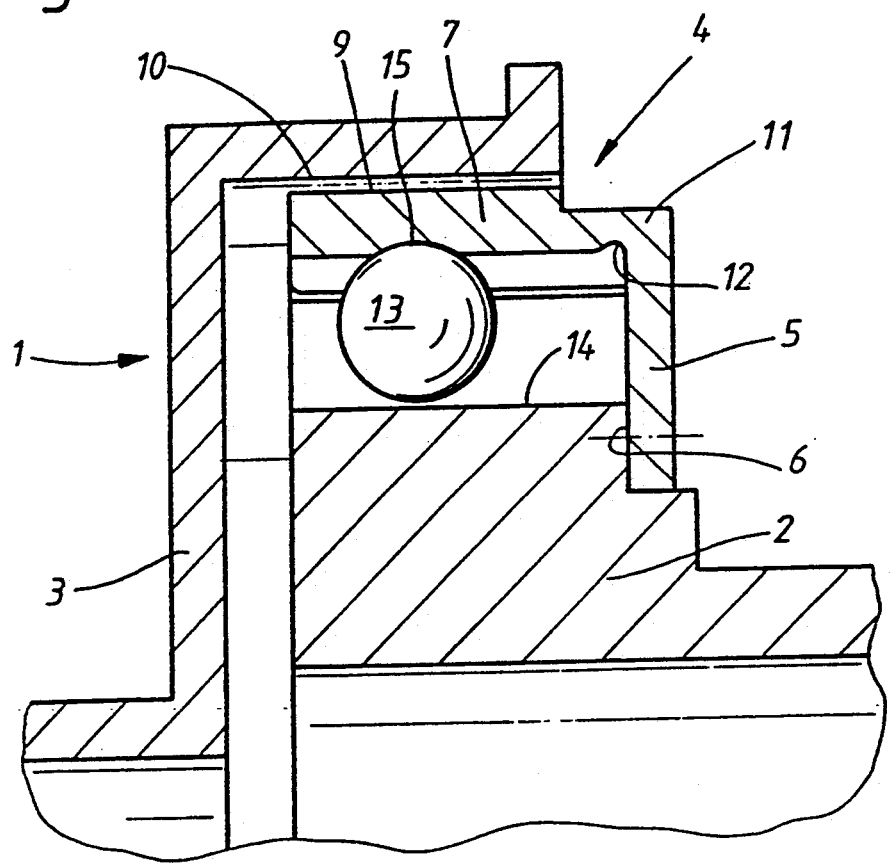
FIG. 1 is an axial section through a position of centrifugal clutch constructed according to the invention.
Figure 2:
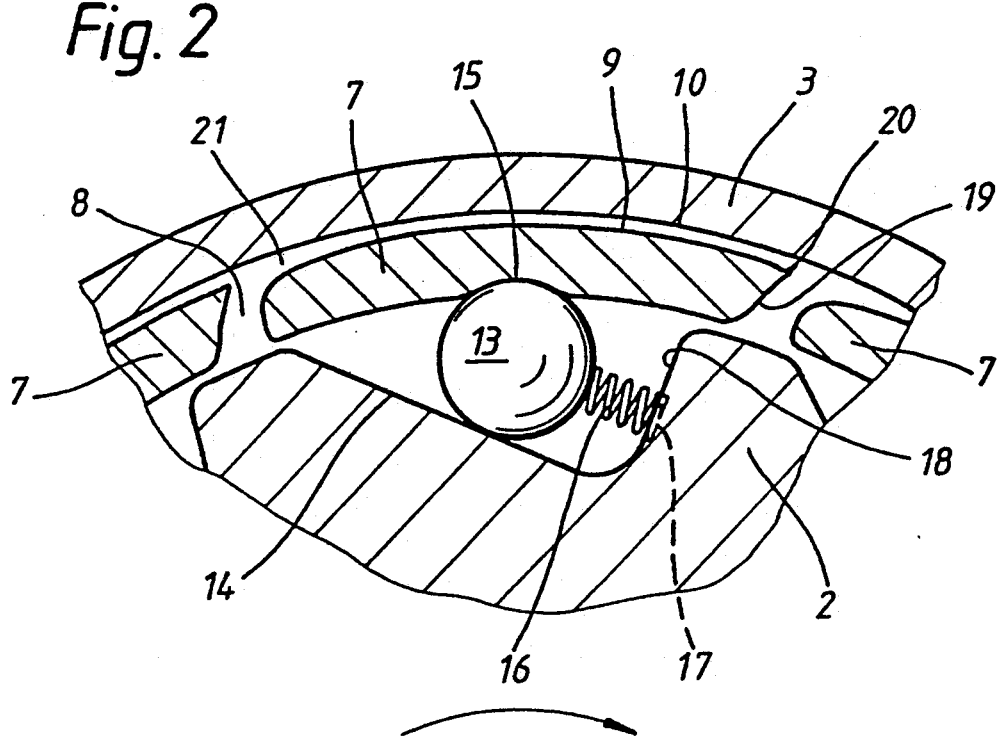
FIG. 2 is a cross-sectional view through the portion of the centrifugal clutch of FIG. 1.

The centrifugal clutch designated generally by numeral 1 in FIG. 1 consists essentially of a driving inner runner 2, a driven, pot-shaped outer runner 3, and an intermediate runner 4 fastened to the inner runner 2. Only a segment of the clutch 1 is shown in FIGS. 1 and 2 since it is symmetrical about an axis of revolution. The intermediate runner 4 comprises a closed ring 5, which is fastened to a radial surface 6 of the inner runner 2, and a plurality of coupling elements 7, which are distributed uniformly over the circumference of the clutch 1. The elements 7 are constructed integral with the ring 5 and extend, starting from the radial outer region of the ring 5, in the axial direction of the clutch 1. The elements 7 are separated from one another by radial slots 8. The ring 5 is fastened or joined to the radial surface 6 so that it is accurately fixed in the radial direction but can be moved in the peripheral direction, together with the clutch elements 7, by a slight amount with respect to the inner runner 2.

The outer surfaces 9 of the clutch elements 7 can have a friction surface or a friction lining and be curved in the peripheral direction with the same radius as the inner surface 10 of the outer runner 3 to define a slight radial spacing between the outer surfaces 9 and the inner surface 10 when the inner runner 2 is at rest. With increasing speed of the inner runner 2, and thus of the intermediate runner 4, the outer surfaces 9 approach the inner surface 10 because of the centrifugal forces acting on the clutch elements 7. The clutch elements 7 bend in upon themselves to a slight extend and, being principally tilted about the points of connection 11 with the ring 5, which as a consequence of the necking 12 has the effect of a weakening the material in the connecting point areas, act like resilient joints.

At a specific clutch speed range in which sliding application of the outer surfaces 9 to the inner surface 10 takes place can be reduced by contact pressure of one ball 13 per clutch element 7. Each ball 13 rolls, on the one hand, on a flat or curved inclined surface 14 of the inner runner 2. The surface 14 is inclined in the peripheral direction as shown in FIG. 2 and rises counter to the direction of rotation of the inner runner 2 shown by the arrow in FIG. 2. On the other hand, each ball 13 is mounted in a recess 15 on the inside of an associated clutch element 7.

When the clutch engagement process starts, the clutch elements 7, and thus the balls 13, are carried along by the outer runner 3 by a slight amount against the direction of rotation of the inner runner 2, so that the balls 13 run up against the inclined faces 14 and increase the contact pressure of the clutch element 7 on the outer runner 3. Compression springs 16 of steel or rubber are carried in recesses 17 and are supported on radial surfaces 18 of the inner runner 2. The springs 16 are situated in front of the balls 13 and exert a slight pressure in the peripheral direction on the balls 13 so that a positive contact with the inclined faces 14 and the clutch elements 7 is permanently maintained.

The front end face 19 of each clutch element 7, as defined by the direction of rotation of the inner runner 2 as shown in FIG. 3, is curved forward in its radially outward region. This forward curvature forms an acute angle with the outer surface 9 of the element 7 and acts as a peeling nose 20 which, as the clutch element 7 approaches the outer runner 3 when the speed of the inner runner 2 is higher than that of the outer runner 3, peels off any oil film present on the inner surface of the outer runner 3. The friction between the clutch element 7 and the outer runner 3 is thus increased.

The rearward region of the outer surface 9 of the clutch elements 7, as defined by the direction of rotation of the inner runner as shown in FIG. 2, become thinner in the radial direction, so that when the speed of the outer runner 3 is higher with respect to that of the inner runner 2, oil is conveyed into the wedge space 21 thereby defined and forms, between the outer surface 9 and the inner surface 10, a film which reduces the friction between these surfaces. This film slows down braking of the outer runner.

It has been found advantageous to undertake final machining of the inner surface 10 of the outer runner 3 and of the outer runner surfaces 9 of the clutch elements 7 at the speed of the engagement of the clutch. As a result, the speed of engagement of the clutch can be accurately fixed if the inner surface 10 and the outer surface 9 have the same diameter. Moreover, it is assured that all outer surfaces 9, aside from the wedge space 21, are simultaneously and completely applied to the inner surface 10 even if the individual clutch elements 7 should have different spring and mass characteristics notwithstanding being worked from one piece.

While a presently preferred embodiment has been shown and described, it should be understood that the same will be susceptible to certain changes and modifications without departing from the principles of the present invention. Therefore, it is not intended that the invention be limited to details shown and described herein, but rather should encompass any such changes and modifications within the scope of the appended claims.

We claim:

1. A centrifugal clutch, comprising a rotatable ring, a drum-shaped outer runner, a driving inner runner over whose circumference are distributed and carried resilient clutch elements constructed in one piece with the rotating ring so as to move radially outwardly with increasing rotational speed and, at clutch speed, bear against an inner surface of the outer runner to drive the outer runner with the elements extending from the ring in an axial direction of the clutch and forming segments whose outer surfaces are matched to the inner surface of the outer runner in a peripheral direction, wherein the ring forms, with the clutch elements, an intermediate runner, and is operatively associated with the inner runner such that, upon fixing of the intermediate runner with respect to the inner runner in a radial direction, a slight relative motion of the intermediate runner in the peripheral direction is provided, and rolling members which are supported on inclined faces of the inner runner, which faces are arranged between the associated clutch elements and the inner runner and rise in a direction opposite to a direction of rotation of the inner runner.

2. The centrifugal clutch according to claim 1, wherein the faces are flat surfaces.

3. The centrifugal clutch according to claim 1, wherein the faces are curved surfaces.

4. The centrifugal clutch according to claim 1, wherein the ring is joined to a radial surface forming a shoulder on the inner runner.

5. The centrifugal clutch according to claim 1, wherein the clutch elements are associated with the ring resiliently via reduced material portions to permit tilting of the clutch elements about the portions.

6. The centrifugal clutch according to claim 4, wherein the clutch elements are associated with the ring resiliently via reduced material portions to permit tilting of the clutch elements about the portions.

7. The centrifugal clutch according to claim 1, wherein springs are supported on radial faces of the inner runner to bias the rolling members in the direction in which the inclined faces rise.

8. The centrifugal clutch according to claim 4, wherein springs are supported on radial faces of the inner runner to bias the rolling members in the direction in which the inclined faces rise.

9. The centrifugal clutch according to claim 5, wherein springs are supported on radial faces of the inner runner to bias the rolling members in the direction in which the inclined faces rise.

10. The centrifugal clutch according to claim 1, wherein each of the clutch elements has a front end face, as defined in a direction of rotation of the inner runner, which curves forward in its radially outward region and forms an oil-peeling nose with the outer surface of the element.

11. The centrifugal clutch according to claim 4, wherein each of the clutch elements has a front end face, as defined in a direction of rotation of the inner runner, which curves forward in its radially outward region and forms an oil-peeling nose with the outer surface of the element.

12. The centrifugal clutch according to claim 5, wherein each of the clutch elements has a front end face, as defined in a direction of rotation of the inner runner, which curves forward in its radially outward region and forms an oil-peeling nose with the outer surface of the element.

13. The centrifugal clutch according to claim 7, wherein each of the clutch elements has a front end face, as defined in a direction of rotation of the inner runner, which curves forward in its radially outward region and forms an oil-peeling nose with the outer surface of the element.

14. The centrifugal clutch according to claim 1, wherein in a rear region of each clutch element, as defined by the direction of rotation of the inner runner, the outer surface of the clutch element is reduced radially inwardly to form an acute angle with respect to the peripheral direction of the element.

15. The centrifugal clutch according to claim 4, wherein in a rear region of each clutch element, as defined by the direction of rotation of the inner runner, the outer surface of the clutch element is reduced radially inwardly to form an acute angle with respect to the peripheral direction of the element.

16. The centrifugal clutch according to claim 5, wherein in a rear region of each clutch element, as defined by the direction of rotation of the inner runner, the outer surface of the clutch element is reduced radially inwardly to form an acute angle with respect to the peripheral direction of the element.

17. The centrifugal clutch according to claim 7, wherein in a rear region of each clutch element, as defined by the direction of rotation of the inner runner, the outer surface of the clutch element is reduced radially inwardly to form an acute angle with respect to the peripheral direction of the element.

18. The centrifugal clutch according to claim 10, wherein in a rear region of each clutch element, as defined by the direction of rotation of the inner runner, the outer surface of the clutch element is reduced radially inwardly to form an acute angle with respect to the peripheral direction of the element.

* * * * *

UNITED STATES PATENT AND TRADEMARK OFFICE
CERTIFICATE OF CORRECTION

PATENT NO. : 5,010,994

DATED : April 30, 1991

INVENTOR(S) : Hermann Hiereth et al.

It is certified that error appears in the above-identified patent and that said Letters Patent is hereby corrected as shown below:

On the title page:

[75]  Inventors:  Hermann Hiereth, Esslingen; Dieter Messerschmidt, Korntal, both of Fed. Rep. of Germany

[73]  Assignee:  DAIMLER-BENZ AKTIENGESELLSCHAFT

Signed and Sealed this

Twenty-seventh Day of October, 1992

Attest:

DOUGLAS B. COMER

*Attesting Officer*    *Acting Commissioner of Patents and Trademarks*